J. MILLS.
SIGNALING.
APPLICATION FILED SEPT. 25, 1916.

1,385,091.

Patented July 19, 1921.
2 SHEETS—SHEET 1.

Inventor:
John Mills.

J. MILLS.
SIGNALING.
APPLICATION FILED SEPT. 25, 1916.

1,385,091.

Patented July 19, 1921.
2 SHEETS—SHEET 2.

Inventor:
John Mills.
by [signature], Att'y.

UNITED STATES PATENT OFFICE.

JOHN MILLS, OF WYOMING, NEW JERSEY, ASSIGNOR TO WESTERN ELECTRIC COMPANY, INCORPORATED, OF NEW YORK, N. Y., A CORPORATION OF NEW YORK.

SIGNALING.

1,385,091. Specification of Letters Patent. Patented July 19, 1921.

Application filed September 25, 1916. Serial No. 122,070.

*To all whom it may concern:*

Be it known that I, JOHN MILLS, a citizen of the United States, residing at Wyoming, in the county of Essex and State of New Jersey, have invented certain new and useful Improvements in Signaling, of which the following is a full, clear, concise, and exact description.

This invention relates to wireless signaling and more particularly to the operation of wireless receiving instruments, and has for its object to provide method and means for minimizing the production of false signals by disturbing waves, strays or statics.

It has been previously proposed to reduce the disturbances produced by strays by providing two circuits tuned to different frequencies for controlling the signal receiving instrument. A disturbance due to strays will excite the two circuits equally and supposedly produce no signal, as the currents in these circuits or the fluxes produced thereby are opposed in their action on the signaling instrument. The signals are received at a single frequency and excite only one of the circuits to produce the operation of the receiving device.

The operation of this system is unsatisfactory as the opposed currents or fluxes to be exactly neutralized must have instantaneous values that are equal in magnitude. This is an impossible condition in the above system, as the circuits, being tuned to different frequencies, are unbalanced as to wave form.

To provide a system in which the strays are effectively eliminated, this invention provides for balancing, not the instantaneous values of the currents, but the energy in the circuits. As a stray excites the circuits equally, the energies are neutralized, and it is immaterial what the instantaneous values of the currents may be, as the energy responsive devices controlling the signaling instrument integrate the energy received, and do not respond to the instantaneous current values. The single frequency signal oscillations, however, excite the circuits unequally to effect the desired operation of the receiving instrument.

Figure 1:
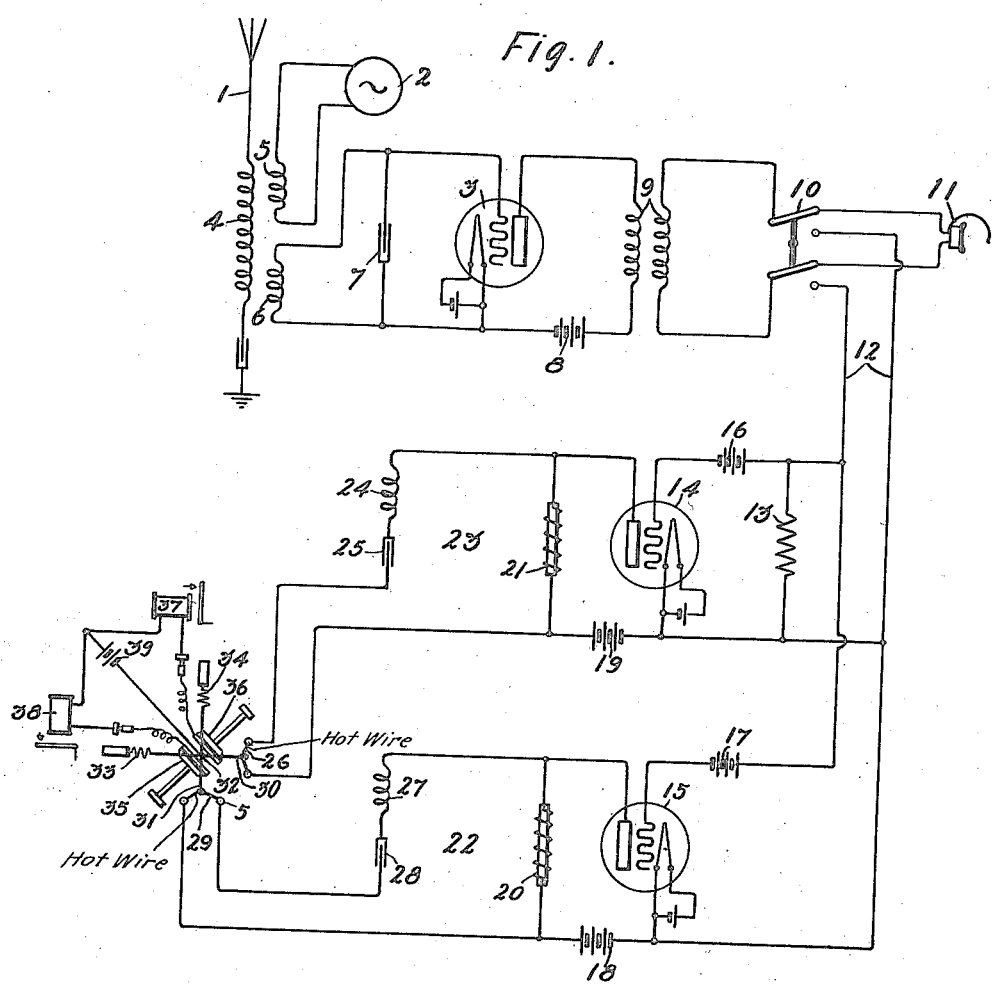
Figure 2:
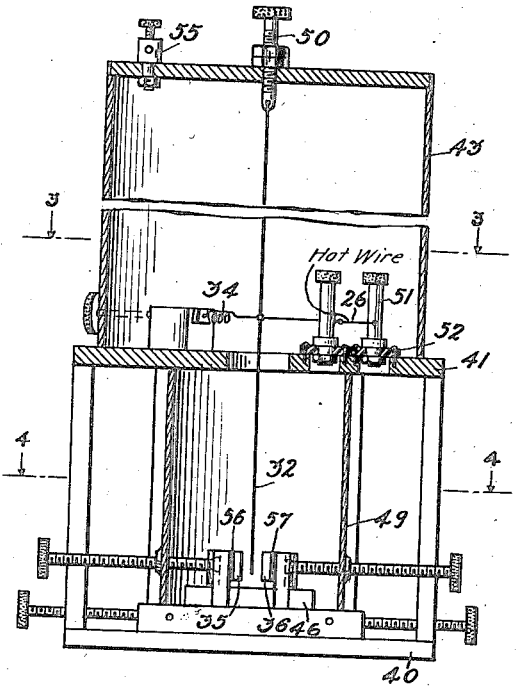
Figure 3:
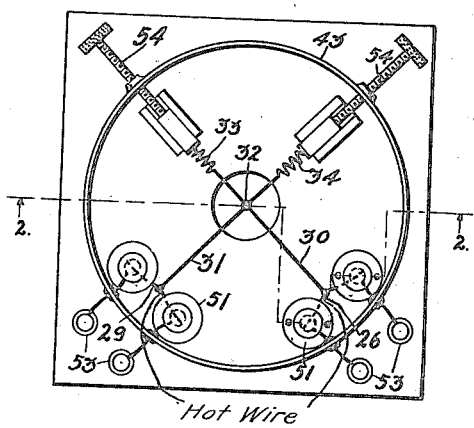
Figure 4:
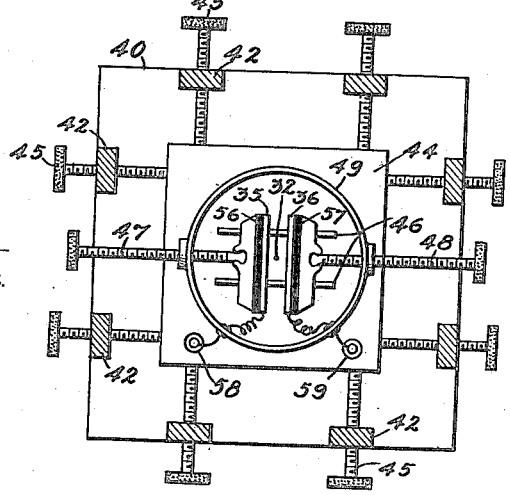

This will be better understood by referring to the drawing, in which Figure 1 is a diagram of connections for a system embodying the invention; Fig. 2 is a sectional elevation of a switch mechanism, the section being on line 2—2, Fig. 3; Fig. 3 is a section on line 3—3, Fig. 2; Fig. 4 is a section on line 4—4, Fig. 2.

The system in Fig. 1 is adapted for the heterodyne reception of signals. As shown, antenna 1 is coupled to the local generator 2 and to the detector 3 by means of the coils 4, 5 and 6. The generator 2 supplies oscillations of a frequency different from that for which the antenna 1 is tuned. The detector 3 is a three-element vacuum tube of the audion type, and has condenser 7 shunted across its input circuit. Space current in the output circuit of the detector is supplied by the battery 8. The detector is coupled by means of transformer 9 to the two-way switch 10, which is adapted to connect the output circuit of the detector either to the receiver 11 or the circuit 12 in which the static disturbances are to be eliminated. The energization of circuit 12 is adapted to effect the operation of a suitable translating device such as a "calling-in" apparatus, printing telegraph, or other mechanical receiver. The current from the output circuit of the detector is supplied to the resistance 13 when switch 10 is connected to circuit 12. As the energy received in this resistance is comparatively feeble and insufficient to operate a mechanical receiver, it is desirable to amplify the energy in the output circuit of the detector. Accordingly, the amplifiers 14 and 15 have their input circuits connected in shunt to the resistance 13, the latter serving as a source of potential for the amplifiers. The amplifiers are of the space discharge type and comprise evacuated tubes having input circuits connecting their grids or control electrodes with their heated filamentary electron emitting cathodes and output circuits controlled by the grids and connecting the cathodes with their respective anodes. Such devices being well known in the art, need no further description.

The grid potential of the amplifiers is suitably adjusted by means of the batteries 16 and 17. The space current in the output circuits of the amplifiers is supplied by the batteries 18 and 19 through the impedances 20 and 21, respectively. In shunt to each of the impedances 20 and 21 are the output circuits 22 and 23, respectively, tuned to different audio-frequencies by means of the induction coils 27 and 24, and the condensers 28 and 25. The circuit 23 will be tuned to the beat frequency between the incoming signal waves and the frequency of the generator 2. The energy in circuit 23 will be translated into heat by means of the thermal element 26. Likewise, the circuit 22 is adapted to supply energy to the thermal element 29.

The thermal elements 26 and 29 are connected by means of insulating strips 30 and 31 to a movable contact 32. The normal position of the contact 32 when the thermal elements are not heated is adjusted by means of the suitably tensioned springs 33 and 34, which oppose the tension in the thermal elements. As better shown in Fig. 2, the movable contact 32 is suspended, and disposed about its lower movable end are the stationary adjustable contacts 35 and 36. As shown in Fig. 1, the contact faces of the stationary contacts extend longitudinally substantially parallel with the bisector of the angle formed by the thermal elements 26 and 29. Because of this angular disposition of the thermal elements and the stationary contacts, it is apparent that an equal heating of the thermal elements will result in their equal decreased pull on the springs 33, 34 and the contact 32 will move substantially along the bisector of the angle formed by the thermal elements. The stationary contacts are normally spaced away from the movable contact, and an equal heating of the thermal elements does not disturb this operative relation between these contacts.

However, if only one of the thermal elements is energized, the motion of the movable contact will no longer be along the bisector of the angle formed by the thermal elements, but the movable switch member will contact with one of the stationary switch members, depending upon which thermal element has been energized. For instance, if only the thermal element 26 is heated, the spring 33 opposite this thermal element will be effective to move the movable switch member 32 into contact with the stationary switch member 35.

The switch contacts 32, 35, 36 may be employed to control any suitable signaling apparatus or a mechanical receiver such as a printing telegraph instrument. As shown, the switch is adapted to control the relays 37 and 38 which may control the selected translating device or a suitable signaling instrument may replace the relays. The movable contact 32 is connected to one pole of the battery 39; the other pole of the battery is connected through each of the relays 37 and 38 to the stationary switch members 36 and 35 respectively.

For details of the switch mechanism, reference may be made to Figs. 2, 3 and 4. The switch mechanism is suitably housed by means of the base 40, spaced above which is the platform 41, supported by means of four pairs of posts 42.

The platform 41 is adapted to support the casing 43 from which is adjustably suspended the movable contact member 32. The base 40 carries the adjustable switch block 44 which may be angularly adjusted by means of the screws 45 threaded into the posts 42. The adjustable switch block 44 is provided with rails 46 on which the switch members 35 and 36 are adapted to slide. The contact face of each of the switch members 35 and 36 is insulated from its adjusting screws 47 and 48 by means of the insulating strips 56 and 57. Connection to the switch members 35 and 36 may be made by means of the binding posts 58 and 59 in electrical connection with each of the movable switch members.

The distance between the switch members 35 and 36 is adjusted by means of the screws 47 and 48 threaded into the housing 49 which surrounds all of the switch members. If desired this housing 49 may contain a suitable fluid for damping the motion of the movable switch member 32. The height of the movable switch member may be adjusted by means of the screw 50 in the top of casing 43. The movable switch member has connected thereto, by means of the insulating members 30 and 31, the hot-wire elements 26 and 29, each of which hot-wire elements is supported on posts 51, the latter being mounted on the platform 41 by means of the insulating supports 52. Electrical connection to the hot-wire elements may be made by means of the binding posts 53 (Fig. 3). The movable switch member 32 is normally positioned so that its lower extremity is between and spaced from the stationary switch members 35 and 36. The normal position of the movable switch member may be conveniently adjusted by means of the springs 33 and 34, connected to the movable switch members. The tension of each of the springs may be varied by means of the adjusting screws 54 threaded into the casing 43. The casing 43 is metallic so that the binding post 55 in the top of this casing is in electrical connection with the movable switch member.

The thermal elements 26 and 29 have a comparatively large thermal time constant such that approximately the maximum heating effect will just be produced by the energy of a wave train which is received for the time interval of a dot of a signal code. The time of integration will in any case be longer than any complete oscillation in circuit 23. It will preferably be as long as several times the period of such oscillations since a considerable number of oscillations in circuit 23 will constitute the shortest signal element. The thermal elements are consequently comparatively sluggish in their action in that they do not follow the minute variations in the current, but rather integrate the energy in the circuit over a small interval of time.

As to the operation of the system, it will be apparent that at times when the receiver 11 is not in use, the switch 10 may connect the detector to the calling-in apparatus or other translating device such as a printing telegraph. If a signal is received at a given frequency, such that the difference between this frequency and that of the generator 2 is the frequency for which the circuit 23 is tuned, then the thermal element 26 will be energized to produce an operation of the translating device controlled by the contacts 32 and 35. A static disturbance, however, will excite the two tuned circuits 22 and 23 in a like manner. Under this condition the thermal elements 26 and 29 will be equally energized, and the contact 32 will move parallel to the stationary contact members, and consequently no false signal will be given. In fact, no false signal will be given in case the thermal elements are not exactly equally energized by a static disturbance, since the moving contact has a certain amount of free play between the stationary contacts. The adjustability of the stationary contacts provides for determining the inequality of the energization that may exist before the movable contact will close the circuit to produce a signal.

In case a static disturbance and a signal are simultaneously received by the two tuned circuits, the static energy will produce substantially a parallel motion of the movable switch member, but this will not interfere with a lateral motion of the movable switch member caused by an unequal energization of the thermal elements, due to the energization of only one of the tuned circuits by the received signal oscillations, so that the desired signal will be received without interference regardless of the simultaneous energization of the tuned circuits due to a static disturbance.

If the signals are to be received in only one of the two tuned circuits, then one of the translating devices 37 or 38, and the circuit controlled thereby, may be dispensed with.

The description of one form of system embodying the invention is not to be construed as a limitation of the invention to use in the particular system described. Various features of the invention may be variously applied in different forms of systems. The novel features believed to be inherent in the invention are defined by the appended claims.

What is claimed is:

1. The method of eliminating interference which consists in translating the interfering energy into a plurality of integrated effects the time of integration being longer than the period of any audio-frequency signal oscillation to be received, modifying one of said integrated effects in accordance with the signals to be received, and in controlling a signaling device in accordance with said integrated effects.

2. The method of eliminating interference which consists in translating the interfering energy into a plurality of thermal effects, in modifying one of said thermal effects in accordance with the signals to be received, in opposing said thermal effects, and in receiving signals in accordance with said opposed thermal effects.

3. The method of receiving signals free from interference which consists in translating the interfering energy into a plurality of thermal effects, in modifying one of said thermal effects in accordance with the signals to be received, in producing mechanical motion in accordance with said opposed thermal effects, and in receiving signals according to said mechanical motion.

4. A signal receiving station including two thermal elements having large thermal time constants, a signal indicator controlled by said elements, and means whereby received signals of predetermined frequency act upon said elements to cause said indicator to give indications, said means being constructed to cause received impulsive excitations to act upon said elements so as to produce no indications by said indicator.

5. A signaling system comprising a plurality of tuned circuits, each tuned to a different frequency, thermal elements in said circuits, and a signaling device differentially controlled in accordance with the condition of energization of said elements.

6. In a signaling system comprising a plurality of tuned circuits each tuned to a slightly different frequency, a thermally operated energy responsive device having a large thermal time constant in each of said circuits, and signaling means controlled by said devices.

7. A signaling system comprising a plurality of circuits, each tuned to a different frequency, means for supplying detected oscillations to said circuits, means in each of said circuits for integrating the energy in said circuits over a time longer than the period of any audio-frequency signal oscillation to be received, a signaling device, said integrating means being differentially related with respect to said signaling device whereby the latter is unresponsive to a static disturbance.

8. The combination of a plurality of circuits each tuned to a different frequency, each of said circuits including an energy integrating device, and a movable member controlled by said energy integrating devices.

9. The combination of a plurality of circuits each containing inductance and capacity elements and tuned to a different frequency, each of said circuits comprising a hot wire member and a movable contact conjointly controlled by said hot wire members.

10. The combination of a movable contact, a plurality of angularly disposed energy responsive devices connected to said contact, circuits each selective of a given definite frequency within the utilizable range for energizing said devices, and a stationary contact associated with said movable contact.

11. The combination of a plurality of circuits each selective of a given definite frequency within the utilizable range, thermally operated energy responsive devices in each of said circuits, a movable contact, said devices being symmetrically disposed about and connected to said movable contact, tensioning means for said contact, a stationary contact, and an electric circuit including a source of current and a translating device controlled by said contacts.

12. A signal receiving station having an input circuit and two branch circuits associated therewith, a movable switch member, a pair of means controlled by each said branch circuit respectively, and other means for causing said switch member to be under the conjoint control of both of said pair of means for one sort of influence received by said input circuit and under the independent control of one of said pair of means for another sort of influence.

13. A signal receiving station having an input circuit and two branch circuits associated therewith, a movable switch member, elements controlled by each of said branch circuits respectively, and other means for causing said switch member to be under the conjoint control of both of said elements for one sort of influence received by said input circuit, and under the independent control of one of said elements for another sort of influence occurring either simultaneously with or independently of said first sort of influence.

14. In a signal receiving station, a signal indicating means including a relaying device; a receiving conductor, two paths for the transmission of received energy from said receiving conductor to said relaying device, and electro-mechanical devices in said paths whereby the electrical energy impressed upon said paths acts upon said relaying device, the characteristics of said paths being such that impulses of a predetermined frequency acting on said receiving conductor cause said indicating means to indicate while impulsive excitation of said conductor does not cause said indicating means to indicate.

15. The combination of a pair of tuned circuits, a movable switch member, thermally operated means in each of said circuits for operating said switch member, said means being angularly disposed about said switch member, and a stationary switch means adjacent said movable switch member, said stationary switch means having two contact faces on opposite sides of said movable switch member.

16. The combination of a pair of tuned circuits each tuned to a different frequency, a movable switch member, devices operable by current in each of said circuits and connected to said switch member, and a pair of stationary switch members adjacent said movable switch member, the contact faces of said stationary switch members being located adjacent different sides of said movable member.

17. In a signal receiving station, a movable contact and a stationary contact, two circuits associated with said movable contact, said circuits each containing translating devices and means whereby, when said circuits are equally energized, said movable contact is caused to move, but not to change its operative relation to said stationary contact, and whereby when said circuits are unequally energized said translating devices cause said movable contact to alter its operative relation to said stationary contact.

18. In a signal receiving station, two elements having a normal associative relation and a signal receiving associative relation, two circuits associated with said elements, and means associated with said circuits for acting on one of said elements so as to cause no change in said normal relation when said circuits are equally energized, said means also being associated with said elements for causing a change from said normal relation to said signal receiving relation when said circuits are unequally energized.

19. In a signal receiving station, an element having freedom to move in two senses, a signal receiving conductor, a pair of translating devices operatively connected to said element whereby energy received in said conductor may affect said element, and means interposed between said conductor and said translating devices whereby waves of signaling frequency acting upon said conductor cause the movement of said element in one sense and disturbing impulses acting upon said conductor cause movement in another sense.

20. The combination of a movable switch member, a pair of angularly disposed hot wire elements connected to said member, means for making electrical connection with said hot wire elements, a plurality of angularly disposed springs connected to said member, means for adjusting the tension of said springs, a pair of spaced stationary switch members disposed one on either side of said movable switch member, and means for angularly adjusting said stationary switch members.

21. The combination of a receiving conductor, a plurality of circuits each selective of a given definite frequency associated therewith, a switch, thermally operated means in said circuits for controlling said switch, and a circuit including a source of current and a translating device controlled by said switch.

22. The combination of a receiving conductor, a pair of circuits each selective of a given definite frequency associated therewith, a switch comprising a stationary contact and a movable contact, a hot wire element in each of said circuits for controlling said movable contact, said hot wire elements being angularly disposed about said movable contact, said stationary contact extending substantially parallel to the bisector of the angle formed by said hot wire elements, and a circuit including a source of current and a translating device controlled by said contacts.

23. The combination of a receiving conductor, a pair of tuned circuits associated therewith, a switch comprising a movable contact and stationary contacts on opposite sides of said movable contact, means in each of said circuits for controlling said movable contact, said means each being operably related to said movable contact for moving said contact in non-parallel planes respectively, a source of current, means for connecting one pole of said source to said movable contact, circuits for connecting the remaining pole of said source to said stationary contacts, and a translating device in each of said last mentioned circuits.

24. A signal receiving system including an element free to move in two directions, a receiving antenna, two thermal elements controlling said movable element, means operatively connecting said antenna and said thermal elements to cause received signal waves to move said movable element in one direction and to cause received impulsive excitations of said antenna to move said movable element in another direction.

25. In an electrical receiving system the combination of a plurality of space discharge repeaters having separate output circuits, a signal receiving device under the conjoint control of said output circuits, input circuits for said repeaters, a resistance in common to said input circuits, and a wave conveying conductor, said resistance being in circuit with said conductor.

26. In combination, a conductor, a resistance element connected across said conductor, a plurality of space discharge repeaters having separate output circuits, and a circuit changing device under the conjoint control of said circuits, each repeater having a cathode and an impedance controlling element, each cathode being connected to a terminal of said resistance and each impedance controlling element being connected to a terminal of said resistance, the path between each impedance controlling element and its respective cathode having a flat transmission characteristic over a wide range of frequencies.

27. The method of selective reception which comprises combining received waves with locally generated waves, selectively transmitting the resultant waves through two paths, applying the resultant waves to a translating device to control the opening and closing of a circuit, and causing said device to assume one of three conditions dependent upon the relative condition of energization of said circuits.

28. The method of selective reception which comprises combining received waves with locally generated waves, transmitting the resultant waves through two paths, selectively extinguishing in the paths components of the energy transmitted, and producing a differential effect upon a device with the unextinguished energies of the two paths.

29. A receiving system comprising a receiving conductor, a local source of waves, means for combining waves from said source with waves received by said conductor, two circuits connected to said combining means, means in said circuits selective of different frequencies, a circuit controlled by said two circuits, and means whereby equal energization of said two circuits at a given instant causes no variation of said controlled circuit while unequal energization causes variation thereof.

30. A receiving system comprising a receiving conductor, two selective circuits connected in energy receiving relation thereto, a signal circuit controlled by a signal circuit controlling relay having a movable element under the conjoint control of said selective circuits, means whereby the tendency of said element to move is varied according to the preponderant energization of one or the other of said circuits, and means whereby the impedance of said signal circuit is prevented from being varied if said selective circuits are simultaneously equally energized.

In witness whereof, I hereunto subscribe my name this 22d day of September, A. D. 1916.

JOHN MILLS.